March 20, 1928. 1,663,426

E. S. TRONZO

GAS VALVE

Filed June 1, 1927

Ernest S. Tronzo,
INVENTOR

WITNESS:

ATTORNEY

Patented Mar. 20, 1928.

1,663,426

UNITED STATES PATENT OFFICE.

ERNEST S. TRONZO, OF AKRON, OHIO.

GAS VALVE.

Application filed June 1, 1927. Serial No. 195,728.

This invention relates to fluid pressure cut off valves and its general object is to provide a valve primarily designed for gas burners and the like to permit free flow of the gas when the pressure is normal or in excess, but in the event the pressure gets below a non-burning degree, the valve will automatically close and must be manually opened, with the result the valve will prevent fire, explosions or asphyxiations.

A further object of the invention is to provide a valve, designed for controlling the flow of gas where the pressure thereof fluctuates, that is simple in construction, and inexpensive to manufacture, yet will perform its intended function for a prolonged period of time, with little or no attention, other than manually opening the same as set forth.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which.

Figure 1:
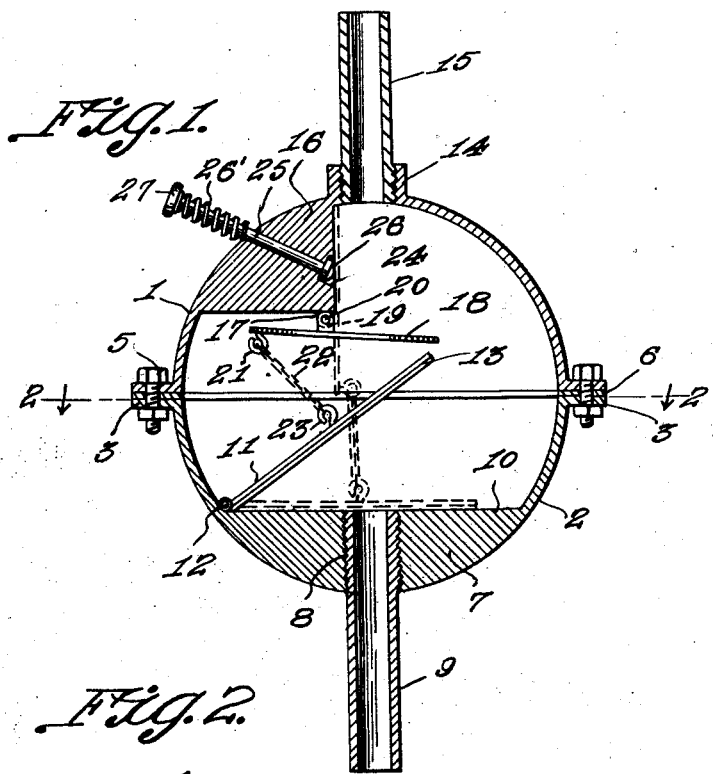
Figure 1 is a vertical sectional view taken through the valve forming the subject matter of the present invention and its inlet and outlet pipes.
Figure 2:
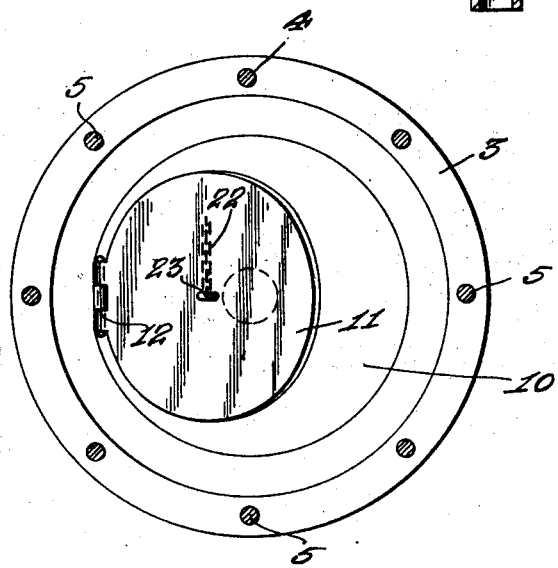
Figure 2 is a sectional view taken approximately on line 2—2 of Figure 1.
Figure 3:
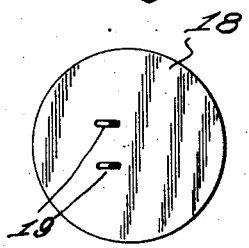
Figure 3 is a detail view of the valve plate operating disk.

Referring to the drawings in detail it will be noted that the valve includes a casing which is made up of substantially semi-circular sections indicated by the reference numerals 1 and 2. Each of the sections is provided with an annular flange 3 which are formed with openings 4 and these flanges 3 are adapted to be arranged in confronting relation in a manner whereby the openings thereof are disposed in registration to receive the bolt and nut connections 5. Disposed between the flanges is a gasket 6 formed from compressible material so as to provide a leak proof connection as will be readily apparent.

The section 2 which also may be termed the lower section has formed interiorly of its bottom a solid portion 7, and centrally arranged in this solid portion 7 and extending through the same is a threaded bore 8 which threadedly receives the inlet pipe 9 as best shown in Figure 1 of the drawings. The solid portion 7 is formed with a flat upper surface 10 which provides a valve seat for a plate valve member 11 which is hingedly secured adjacent the edge of the solid portion as at 12. The plate valve member has secured to its under surface resilient material 13 which may be formed from rubber but in any event it is adapted to prevent the passage of fluid about the valve member when the same is disposed in its closed position as shown in dotted lines in Figure 1.

The section 1 as shown may be termed the upper section and has secured to or formed integral with its upper end a threaded collar 14 which is adapted to threadedly receive an outlet pipe 15. The upper section 1 has interiorly formed and laterally disposed therein a solid portion 16 which has depending therefrom spaced ears 17 to pivotally receive a disk 18 having ears 19 cooperating with the ears 17 to receive the pivot pin 20 as shown. The disk 18 has arranged adjacent its edge an eye 21 which receives one end of a flexible element 22 while the opposite end is fixed to an eye 23 secured to and rising approximately centrally of the plate valve member 11.

The solid portion 16 has arranged at an inclination therein a bore which communicates with a recess 24 formed in its vertical wall and mounted for reciprocation in this bore is a piston rod 25 which has formed on its inner end a piston 26, and the piston 26 is normally disposed in the recess 24 and held therein through the instrumentality of a coil spring 26' which surrounds the rod 25 and has its end convolutions engaging the exterior surface of the section 1 and a head 27 formed on the outer end of said rod.

From the above description and disclosure of the drawings, it will be obvious that I have provided a valve which is normally retained in open position by fluid pressure passing into the casing through the inlet pipe 9 and in the event the pressure should fall below normal, the plate valve member will drop to its closed position and dispose the disk 18 in contacting engagement with the vertical wall of the solid portion 16 as shown in dotted lines in Figure 1. When it is desired to arrange the plate valve member to its open position as shown in full lines in Figure 1, the piston rod 25 is manually pushed against the disk 18 and in the event the fluid pressure is normal, it will retain the plate valve member in open position.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

A gas valve of the character described comprising a casing formed from upper and lower semi-circular shaped sections, means for securing said sections in operative association, an inlet pipe threadedly secured to the lower section, an outlet pipe secured to the upper section, a solid portion having a flat upper surface to provide a valve seat and being formed in the lower section, a plate valve member hingedly secured in the lower section and cooperating with said seat for controlling the inlet pipe, a solid portion formed in the upper section and being laterally disposed therein, a disk hingedly secured to the solid portion of the upper section, flexible means connecting said disk with the plate valve member, spring pressed means arranged at an inclination and slidably mounted in the solid portion of the upper section, and said spring pressed means being engageable with said disk.

In testimony whereof I affix my signature.

ERNEST S. TRONZO.